United States Patent
Snider

(10) Patent No.: US 8,915,018 B2
(45) Date of Patent: Dec. 23, 2014

(54) SLIDER WINDOW ASSEMBLY

(75) Inventor: Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 13/992,252

(22) PCT Filed: Dec. 21, 2011

(86) PCT No.: PCT/US2011/066522
§ 371 (c)(1),
(2), (4) Date: Jun. 7, 2013

(87) PCT Pub. No.: WO2012/088287
PCT Pub. Date: Jun. 28, 2012

(65) Prior Publication Data
US 2013/0255156 A1   Oct. 3, 2013

Related U.S. Application Data

(60) Provisional application No. 61/426,065, filed on Dec. 22, 2010.

(51) Int. Cl.
*B60J 1/16* (2006.01)
*B60J 1/18* (2006.01)

(52) U.S. Cl.
CPC . *B60J 1/16* (2013.01); *B60J 1/1853* (2013.01)
USPC .............................. 49/413; 49/380

(58) Field of Classification Search
USPC .................. 49/213, 216, 360, 380, 408, 413; 296/201, 146.16
See application file for complete search history.

(56) References Cited

U.S. PATENT DOCUMENTS

| | | | |
|---|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |

(Continued)

OTHER PUBLICATIONS

International Search Report and Written Opinion dated May 1, 2012 from corresponding PCT Application No. PCT/US2011/066522.

*Primary Examiner* — Katherine Mitchell
*Assistant Examiner* — Justin Rephann
(74) *Attorney, Agent, or Firm* — Gardner, Linn, Burkhart & Flory, LLP

(57) ABSTRACT

A vehicular slider window assembly (10) includes upper and lower rails (22, 24), at least one fixed window panel (16, 18) and a movable window panel (20). The lower rail comprises a channel (26) and a guide element (28) received in and secured to the channel. The guide element extends at least partially along the fixed window panel and the opening and the channel extends at least partially along the fixed window panel and beyond an end of the guide element and receives a carrier (30) of the movable window therein during loading of the movable window. The movable window is received in the channel at a first depth during the loading process and is raised to a second depth to generally align the carrier with the guide portion (28*a*) of the guide element for insertion of the carrier into the guide portion for movement along the guide portion.

20 Claims, 13 Drawing Sheets

(56) References Cited

U.S. PATENT DOCUMENTS

| | | | |
|---|---|---|---|
| 3,379,859 A | 4/1968 | Marriott | |
| 3,508,361 A | 4/1970 | Ryder | |
| 3,715,707 A | 2/1973 | Anderson | |
| 3,893,260 A | 7/1975 | Cadiou | |
| 3,898,427 A | 8/1975 | Levin et al. | |
| 3,911,245 A | 10/1975 | O'Shaughnessy | |
| 3,964,068 A | 6/1976 | Torii et al. | |
| 3,995,142 A | 11/1976 | Ciardelli et al. | |
| 4,023,008 A | 5/1977 | Durussel | |
| 4,065,848 A | 1/1978 | Dery | |
| 4,081,926 A | 4/1978 | Jardin | |
| 4,124,054 A | 11/1978 | Spretnjak | |
| 4,137,447 A | 1/1979 | Boaz | |
| 4,158,270 A | 6/1979 | Cherbourg et al. | |
| 4,171,594 A | 10/1979 | Colanzi | |
| 4,244,774 A | 1/1981 | Dery | |
| RE30,663 E | 6/1981 | Schnitzius | |
| 4,388,522 A | 6/1983 | Boaz | |
| 4,410,843 A | 10/1983 | Sauer et al. | |
| 4,415,196 A | 11/1983 | Baum et al. | |
| 4,450,346 A | 5/1984 | Boaz | |
| 4,458,445 A | 7/1984 | Sauer et al. | |
| 4,519,443 A | 5/1985 | Sutoh et al. | |
| 4,552,611 A | 11/1985 | Dery et al. | |
| 4,606,159 A | 8/1986 | Kunert | |
| 4,611,849 A | 9/1986 | Trenker | |
| 4,635,398 A | 1/1987 | Nakamura | |
| 4,674,231 A | 6/1987 | Radek et al. | |
| 4,723,809 A | 2/1988 | Kida et al. | |
| 4,738,052 A | 4/1988 | Yoshida | |
| 4,785,583 A | 11/1988 | Kawagoe et al. | |
| 4,883,940 A | 11/1989 | Tokarz | |
| 4,920,698 A | 5/1990 | Friese et al. | |
| 4,934,098 A | 6/1990 | Prouteau et al. | |
| 4,970,911 A | 11/1990 | Ujihara et al. | |
| 4,995,195 A * | 2/1991 | Olberding et al. | 49/118 |
| 5,046,283 A | 9/1991 | Compeau et al. | |
| 5,146,712 A | 9/1992 | Hlavaty | |
| 5,228,740 A * | 7/1993 | Saltzman | 296/146.1 |
| 5,245,788 A | 9/1993 | Riegelman | |
| 5,294,168 A | 3/1994 | Kronbetter | |
| 5,308,247 A | 5/1994 | Dyrdek | |
| 5,333,411 A | 8/1994 | Tschirschwitz et al. | |
| 5,345,717 A | 9/1994 | Mori et al. | |
| 5,363,596 A | 11/1994 | Kronbetter | |
| 5,367,827 A | 11/1994 | Taijima et al. | |
| 5,442,880 A | 8/1995 | Gipson | |
| 5,466,911 A | 11/1995 | Spagnoli et al. | |
| 5,467,560 A | 11/1995 | Camp et al. | |
| 5,473,840 A | 12/1995 | Gillen et al. | |
| 5,505,023 A * | 4/1996 | Gillen et al. | 49/380 |
| 5,522,191 A | 6/1996 | Wenner et al. | |
| 5,525,401 A | 6/1996 | Hirmer | |
| 5,531,046 A | 7/1996 | Kollar et al. | |
| 5,542,214 A | 8/1996 | Buening | |
| 5,560,671 A * | 10/1996 | Ojanen et al. | 296/146.14 |
| 5,572,376 A | 11/1996 | Pace | |
| 5,613,323 A | 3/1997 | Buening | |
| 5,617,675 A | 4/1997 | Kobrehel | |
| 5,711,112 A | 1/1998 | Barten et al. | |
| 5,716,536 A | 2/1998 | Yokoto et al. | |
| 5,724,769 A | 3/1998 | Cripe et al. | |
| 5,724,771 A | 3/1998 | Gipson | |
| 5,784,833 A | 7/1998 | Sponable et al. | |
| 5,799,444 A | 9/1998 | Freimark et al. | |
| 5,799,449 A * | 9/1998 | Lyons et al. | 52/204.51 |
| 5,822,922 A * | 10/1998 | Grumm et al. | 49/360 |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A * | 12/1999 | Freimark et al. | 49/209 |
| 5,997,793 A | 12/1999 | Lahnala | |
| 6,014,840 A | 1/2000 | Ray et al. | |
| 6,026,611 A | 2/2000 | Ralston et al. | |
| 6,038,819 A | 3/2000 | Klein | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 * | 12/2001 | Koneval et al. | 49/121 |
| 6,328,243 B1 | 12/2001 | Yamamoto | |
| 6,490,832 B1 | 12/2002 | Fischbach et al. | |
| 6,525,659 B2 | 2/2003 | Jaffe et al. | |
| 6,591,552 B1 * | 7/2003 | Rasmussen | 49/413 |
| 6,598,931 B2 | 7/2003 | Tamura | |
| 6,691,464 B2 | 2/2004 | Nestell et al. | |
| 6,742,819 B2 | 6/2004 | So et al. | |
| 6,766,617 B2 * | 7/2004 | Purcell | 49/360 |
| 6,902,224 B2 * | 6/2005 | Weinert et al. | 296/146.16 |
| 6,955,009 B2 * | 10/2005 | Rasmussen | 49/413 |
| 7,003,916 B2 | 2/2006 | Nestell et al. | |
| 7,010,883 B2 | 3/2006 | Jaerpsten et al. | |
| 7,051,478 B2 | 5/2006 | Bourque et al. | |
| 7,073,293 B2 * | 7/2006 | Galer | 49/413 |
| 7,155,863 B2 | 1/2007 | Daniel et al. | |
| 7,184,190 B2 | 2/2007 | McCabe et al. | |
| 7,186,118 B2 | 3/2007 | Hansen et al. | |
| 7,219,470 B2 * | 5/2007 | Lahnala | 49/413 |
| 7,255,451 B2 | 8/2007 | McCabe et al. | |
| 7,259,359 B2 | 8/2007 | Davey et al. | |
| 7,395,631 B2 * | 7/2008 | Lahnala | 49/213 |
| 7,400,435 B2 | 7/2008 | Byers et al. | |
| 7,464,501 B2 * | 12/2008 | Arimoto et al. | 49/413 |
| RE40,636 E * | 2/2009 | Weinert et al. | 296/146.16 |
| 7,608,949 B2 | 10/2009 | Busch | |
| 7,626,749 B2 | 12/2009 | Baur et al. | |
| 7,810,284 B2 * | 10/2010 | Murphy et al. | 49/380 |
| 7,871,272 B2 | 1/2011 | Firman et al. | |
| 7,900,863 B1 | 3/2011 | Cheng | |
| 7,934,342 B2 * | 5/2011 | Lahnala | 49/380 |
| 7,963,070 B2 | 6/2011 | Recker | |
| 8,042,664 B2 | 10/2011 | Rutkowski et al. | |
| 8,069,615 B2 | 12/2011 | Heiman et al. | |
| 8,127,498 B2 | 3/2012 | Lahnala | |
| 8,151,519 B2 | 4/2012 | Bello et al. | |
| 8,250,812 B2 | 8/2012 | Hebert et al. | |
| 8,272,168 B2 | 9/2012 | Lahnala | |
| 8,402,695 B2 | 3/2013 | Smith et al. | |
| 8,595,981 B2 * | 12/2013 | Lahnala | 49/413 |
| 2003/0074842 A1 | 4/2003 | Eckhardt et al. | |
| 2003/0140562 A1 | 7/2003 | Staser et al. | |
| 2003/0188490 A1 | 10/2003 | Kraus et al. | |
| 2003/0213179 A1 | 11/2003 | Galer | |
| 2004/0020131 A1 * | 2/2004 | Galer et al. | 49/413 |
| 2004/0065017 A1 | 4/2004 | Priest et al. | |
| 2004/0065018 A1 | 4/2004 | Reginier et al. | |
| 2005/0044799 A1 * | 3/2005 | Kinross et al. | 49/413 |
| 2005/0055884 A1 * | 3/2005 | Kinross | 49/413 |
| 2006/0032140 A1 | 2/2006 | Arimoto et al. | |
| 2006/0061008 A1 | 3/2006 | Karner et al. | |
| 2006/0107600 A1 * | 5/2006 | Nestell et al. | 49/413 |
| 2006/0130405 A1 | 6/2006 | Hemond et al. | |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0155902 A1 | 7/2008 | Kaiser | |
| 2008/0202032 A1 | 8/2008 | Loidolt | |
| 2008/0263960 A1 * | 10/2008 | Murphy et al. | 49/408 |
| 2009/0019778 A1 * | 1/2009 | Lahnala | 49/413 |
| 2009/0322705 A1 | 12/2009 | Halsey, IV | |
| 2010/0122494 A1 * | 5/2010 | Lahnala | 49/358 |
| 2010/0122495 A1 * | 5/2010 | Lahnala | 49/358 |
| 2010/0122496 A1 * | 5/2010 | Lahnala | 49/360 |
| 2010/0122497 A1 * | 5/2010 | Lahnala | 49/413 |
| 2010/0146859 A1 | 6/2010 | Gipson et al. | |
| 2010/0154312 A1 | 6/2010 | Gipson et al. | |
| 2010/0182143 A1 | 7/2010 | Lynam | |

(56) References Cited

U.S. PATENT DOCUMENTS

| | | |
|---|---|---|
| 2010/0240229 A1 | 9/2010 | Firman et al. |
| 2010/0263290 A1* | 10/2010 | Pawloski et al. .............. 49/413 |
| 2010/0263291 A1* | 10/2010 | Bello et al. .................... 49/413 |
| 2011/0030276 A1* | 2/2011 | Smith et al. ..................... 49/70 |
| 2012/0091113 A1 | 4/2012 | Bennett et al. |
| 2012/0091114 A1* | 4/2012 | Ackerman et al. ............ 219/203 |
| 2012/0117880 A1 | 5/2012 | Lahnala et al. |
| 2012/0139289 A1 | 6/2012 | Lahnala |
| 2013/0174488 A1 | 7/2013 | Snider et al. |
| 2013/0255156 A1 | 10/2013 | Snider |
| 2013/0283693 A1 | 10/2013 | Hulst et al. |
| 2014/0047772 A1 | 2/2014 | Hulst |

* cited by examiner

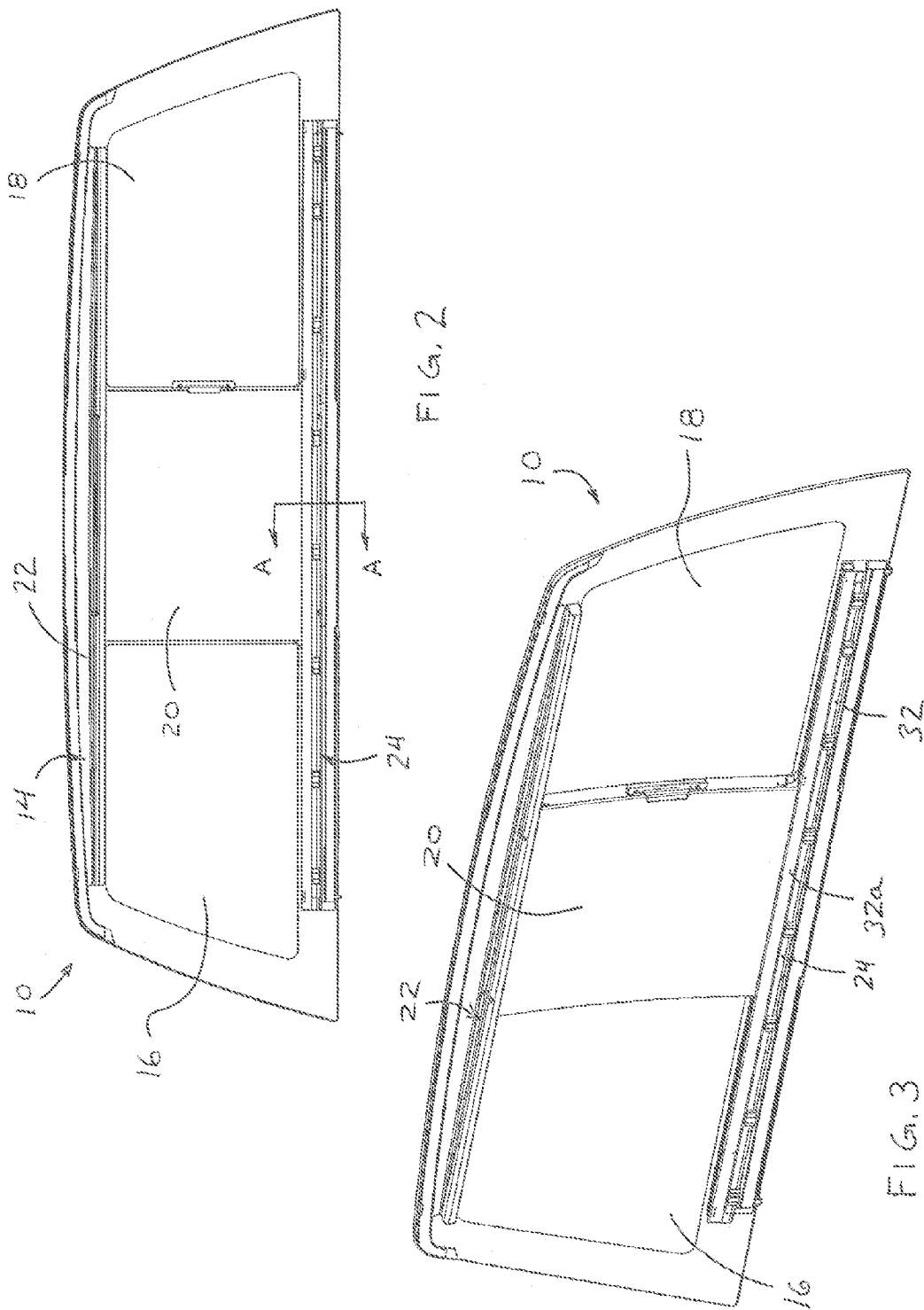

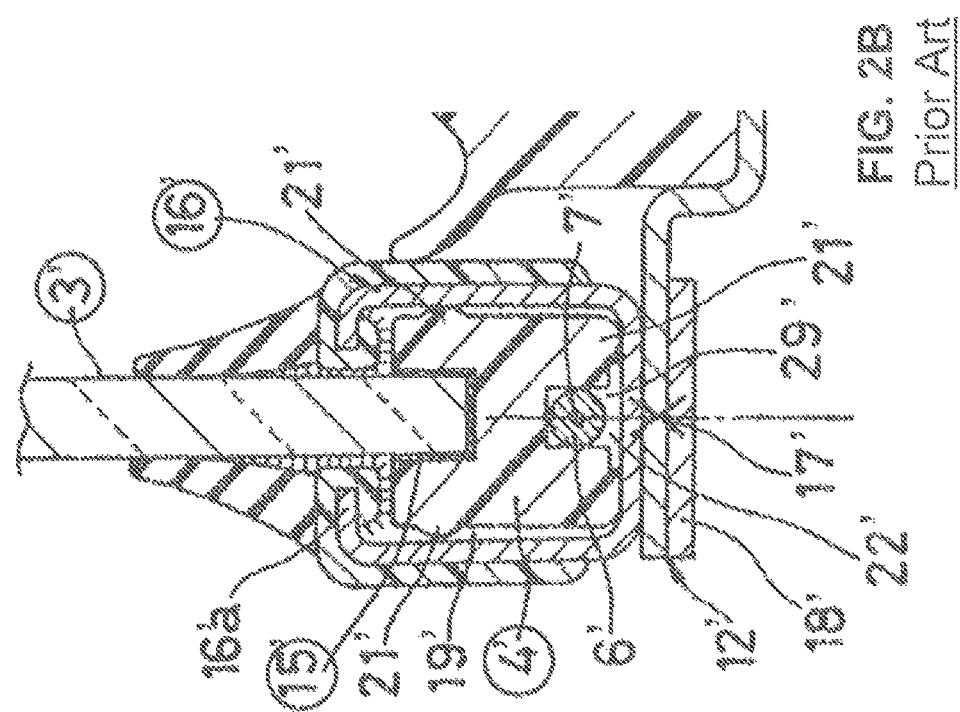

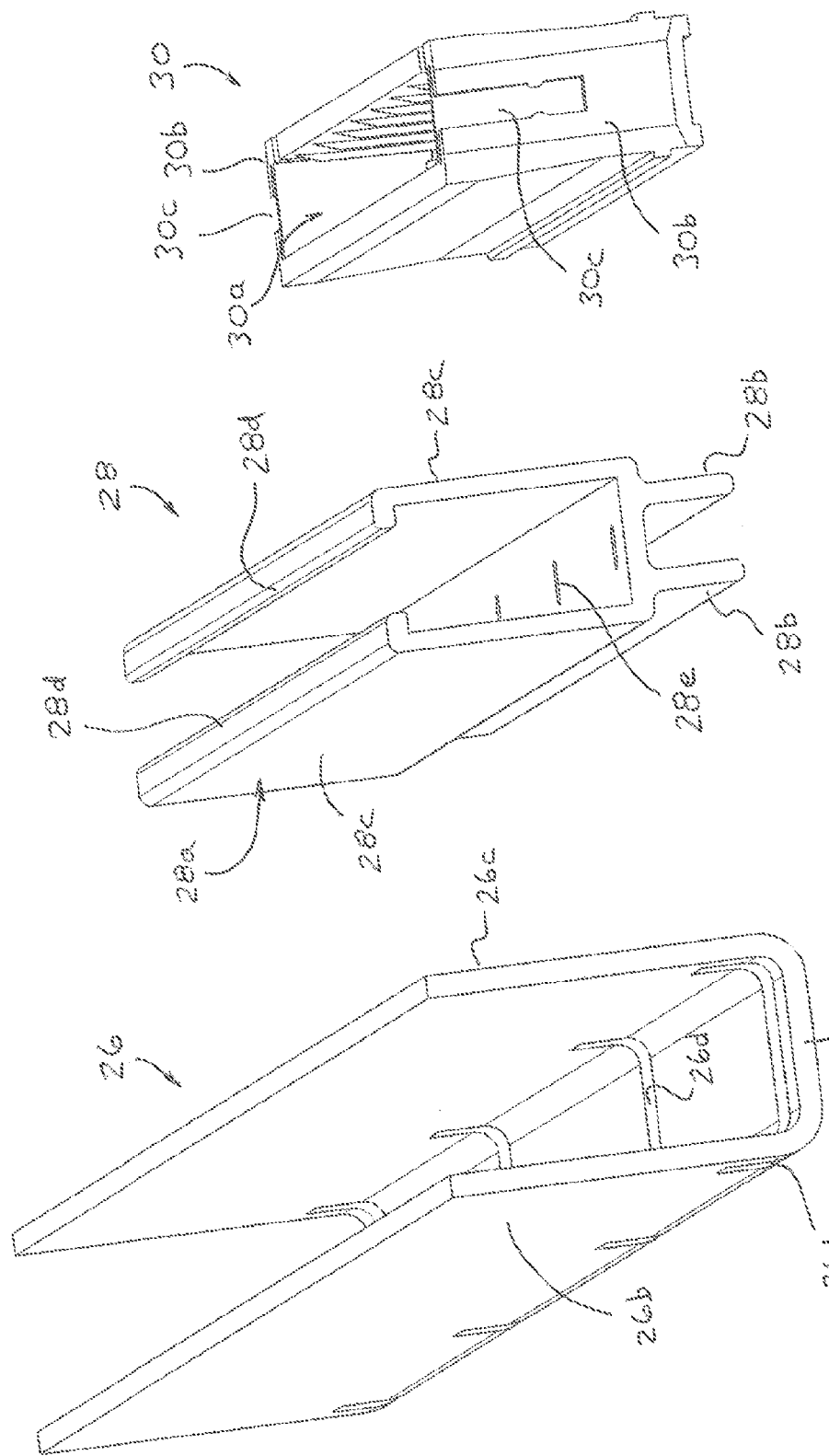

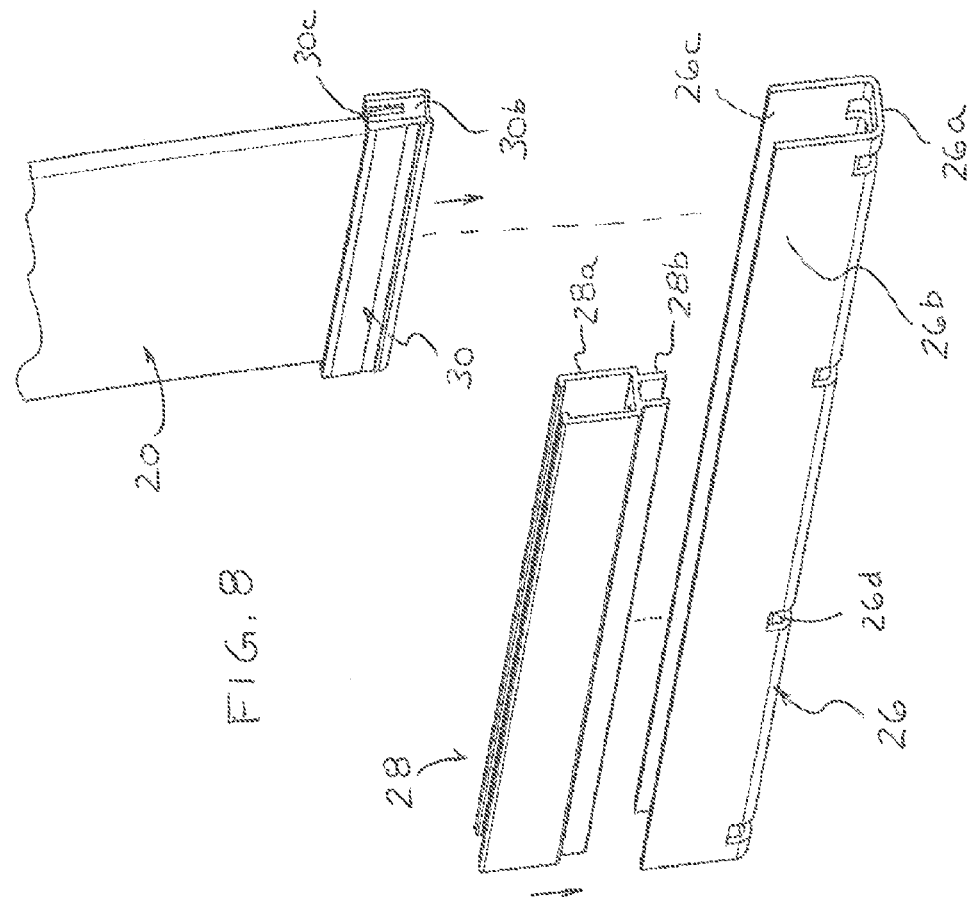
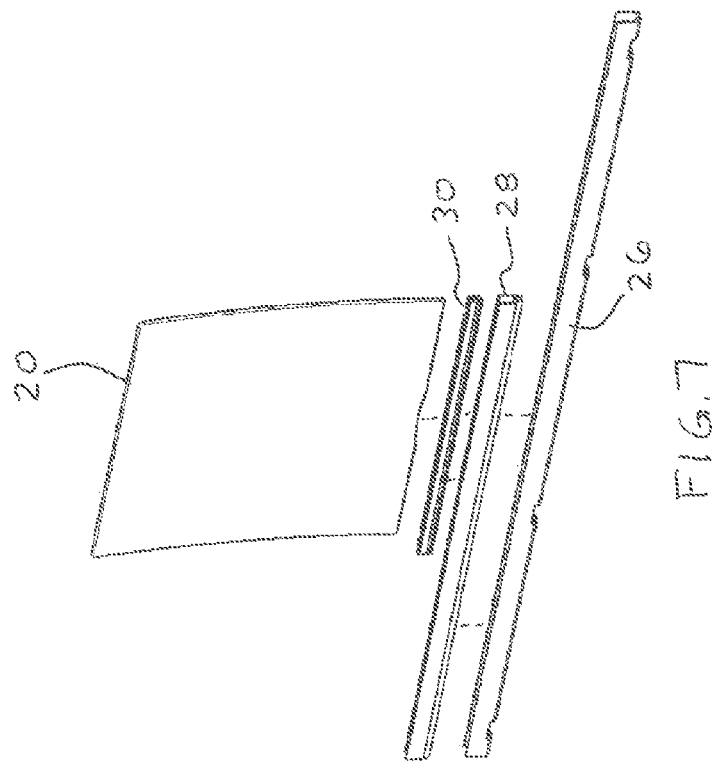

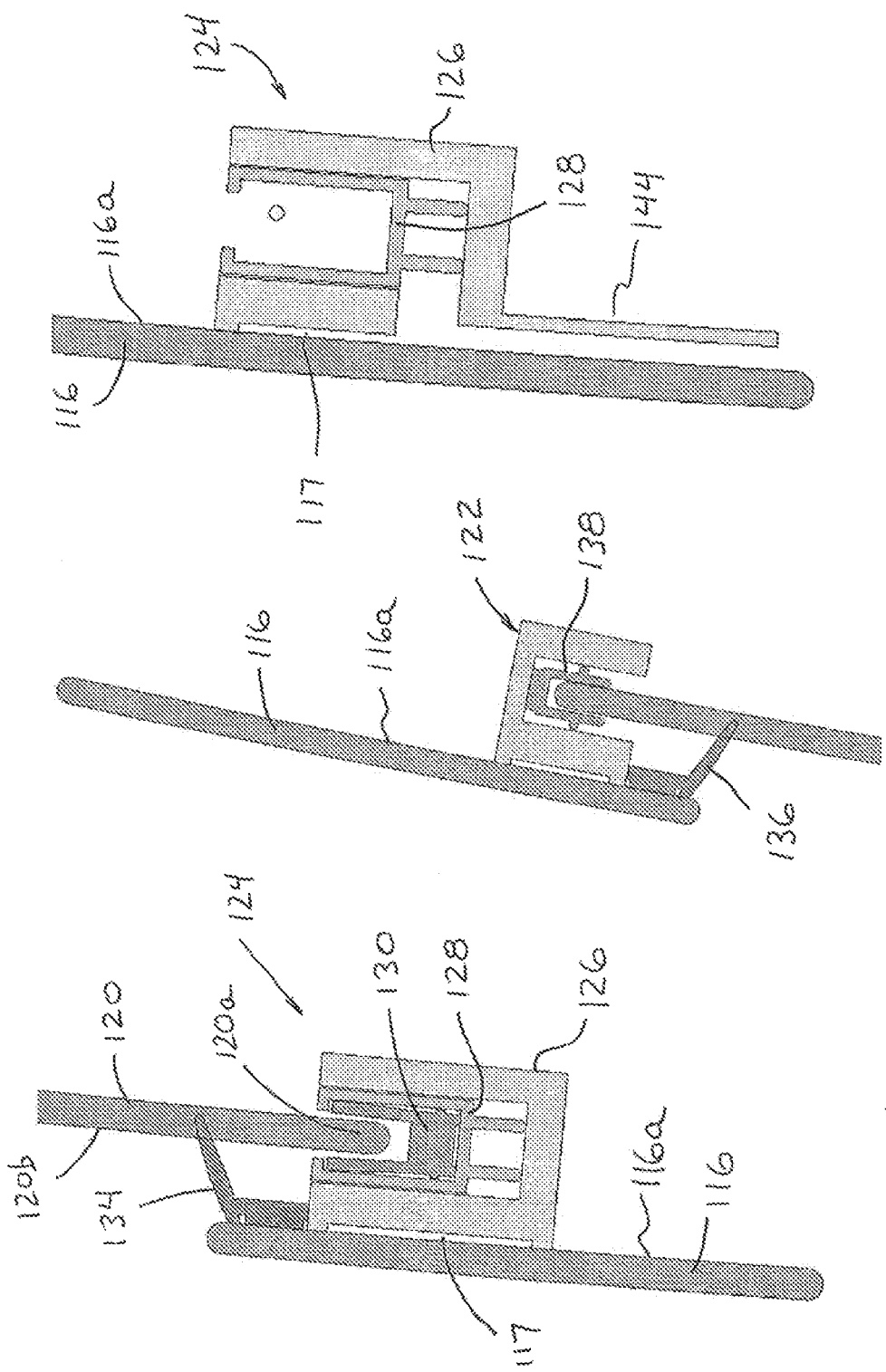

SLIDER WINDOW ASSEMBLY

CROSS REFERENCE TO RELATED APPLICATION

The present application is a 371 national phase entry of PCT Application No. PCT/US2011/0066522, filed Dec. 21, 2011, which claims the filing benefits of U.S. provisional application, 61/426,065, filed Dec. 22, 2010, which is hereby incorporated herein by reference in its entirety

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. Typically, the upper rail includes a resilient filler and is sized to be able to sufficiently receive the upper edge region of the slidable window panel to allow for a carrier at the lower edge region of the slidable window panel to be aligned with and dropped or lowered into the lower rail.

SUMMARY OF THE INVENTION

The present invention provides a rear slider window assembly that has a lower channel and guide element secured and fixed in the lower channel for receiving a carrier of a movable window panel and for guiding the carrier along the channel and guide between its opened and closed positions. The channel preferably extends beyond an end of the guide element a sufficient amount to receive the carrier therein for ease of installation of the carrier that carries the movable window panel and for alignment of the carrier with the guide portion of the guide element. When the carrier is disposed in the channel and aligned with an end of the guide portion, the carrier may be inserted into and moved along the guide portion to the closed position of the movable window panel. The carrier may be attached at each end to a drive cable of a powered window drive system, whereby pulling at either end of the carrier by the respective cable moves the carrier and the movable window panel between its opened and closed positions.

According to an aspect of the present invention, a rear slider window assembly of a vehicle (such as a pickup truck or the like) includes a frame portion having an upper rail and a lower rail. First and second spaced apart fixed window panels are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. The lower rail comprises a generally U-shaped channel that extends at least partially along the first and second fixed window panels and the opening, and the lower rail comprises a guide element that is received in the channel and that is secured and fixed thereto. The lower rail extends at least partially along the first fixed window panel and the opening. A carrier is established at a lower portion of the movable window panel and is configured to be received in, be supported by and to move along an inner surface of a bottom wall of a guide portion of the guide element. The channel extends at least partially along the second fixed window panel and beyond an end of the guide element so as to receive the carrier at the second fixed window panel during loading of the movable window panel in the upper and lower rails. The movable window panel is received in the channel at a first depth during the loading process and is raised to a second depth to generally align the carrier with the guide portion of the guide element for insertion of the carrier into the guide portion for movement along the inner surface of the bottom wall of the guide portion.

The carrier may at each end be connected to a cable of a powered window drive system that operates to move the carrier and movable window panel between its opened and closed positions. In order to facilitate receiving of the carrier in the channel where the guide element is not disposed, it is preferred that a length dimension of the guide element be less than a length dimension of the channel by an amount at least equal to a length dimension of the carrier.

The generally U-shaped channel comprises a lower wall and a pair of spaced apart generally vertical walls extending from the lower wall, and the generally vertical walls have substantially flat inner surfaces. The channel may be insert molded into a mounting element of the rear slider window assembly. The straight, generally flat walls of the channel provide for enhanced molding of the mounting element at and at least partially around the channel while limiting or reducing scrap that may occur in conventional moldings due to warping or flexing or bending of the channels during the molding processes.

These and other objects, advantages, purposes and features of the present invention will become apparent upon review of the following specification in conjunction with the drawings.

BRIEF DESCRIPTION OF THE DRAWINGS

FIG. 2 is a front elevation of the rear slider window assembly of the present invention, as viewed from the forward or interior side of the window assembly when the window assembly is normally mounted to a vehicle;

FIG. 2B is a sectional view of a prior art sliding window for vehicles;

FIG. 3 is a perspective view of the rear slider window assembly of FIG. 2;

FIG. 4 is a perspective view of a lower channel element of the rear slider window assembly of the present invention;

FIG. 5 is a perspective view of a guide element of the rear slider window assembly of the present invention;

FIG. 6 is a perspective view of a carrier of the rear slider window assembly of the present invention;

FIG. 7 is an exploded perspective view of the lower channel element and guide element and carrier and movable window panel of the rear slider window assembly of the present invention;

FIG. 8 is an enlarged perspective view of the lower channel element and guide element and movable window panel assembly of FIG. 7, showing the movable window panel and carrier assembled together;

FIG. 15A is a sectional view of the rear slider window assembly taken along the line A-A in FIG. 14;

FIG. 15C is a sectional view of the rear slider window assembly taken along the line C-C in FIG. 14;

FIG. 15E is a sectional view of the rear slider window assembly taken along the line E-E in FIG. 14.

DESCRIPTION OF THE PREFERRED EMBODIMENTS

Figure 1:
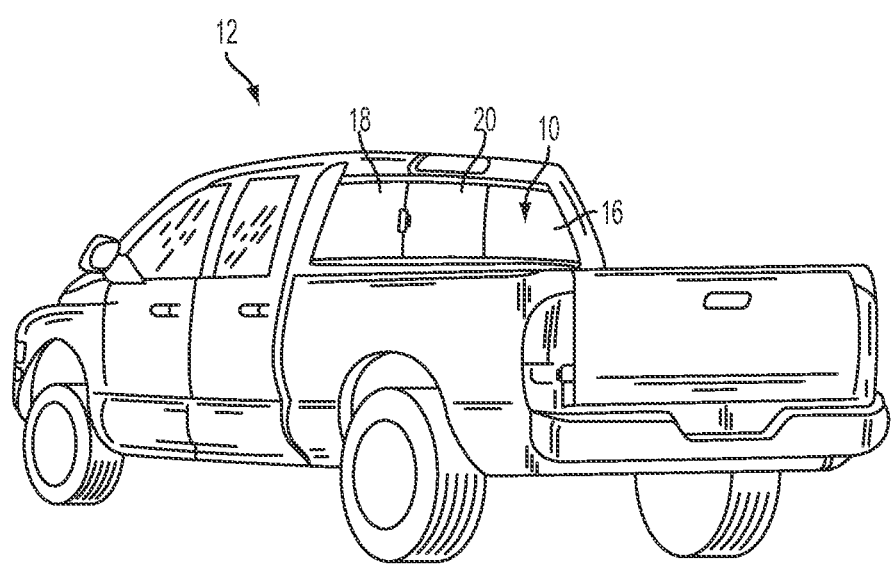
FIG. 1 is a rear perspective view of a pickup truck having a rear slider window assembly in accordance with the present invention.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1-3). Frame 14 comprises an upper rail 22 and a lower rail 24, with the upper and lower edge regions of movable window panel 20 slidably received in and along the respective upper and lower rails 22, 24. Lower rail 24 comprises a generally U-shaped channel 26 disposed generally horizontally along the rear slider window and spanning at least part of each of the fixed window panels 16, 18, with a guide element 28 received in and fixedly secured (such as by gluing or by mechanically securing) in channel 26 and extending only partially along channel 26, such as extending along one of the fixed window panels 16 and the opening for the movable window panel 20. Preferably, guide element 28, which is received in and is fixedly secured in channel 26, extends only partially along about one half of the length dimension of channel 26 and occupies about one half of the length dimension of channel 26 and extends from a distal end portion of channel 26 to about the mid point of channel 26. The lower edge region 20a of the movable window panel 20 is received in or attached to a carrier 30, which is movably received in guide element 28 and is movable or slidable along guide element 28 as the movable window panel 20 is moved between its opened and closed positions, as discussed below.

In the illustrated embodiment, window assembly 10 includes two fixed window panels 16, 18 that are spaced apart so as to define an opening therebetween. Slider or movable window panel 20 is movable along lower rail 24 and upper rail 22 of frame portion 14 to open and close the opening, such as in a manner similar to known slider window assemblies. Slider window panel 20 is disposed at lower carrier 30, which receives the lower perimeter edge region 20a of the slider window panel 20 therein and that is slidably or movably received in the guide element 28 of the lower rail 24 of frame portion 14. The movable or slider window panel 20 is movable such as via manual pushing or pulling at the window panel or in response to actuation of a drive motor of a drive motor assembly or system, which may move cables or the like to impart horizontal movement of the slider window panel 20 along the rails 22, 24. Upper rail 22 may comprise any suitable channel or rail element configured to slidably receive an upper edge portion of the movable window panel, and upper rail 22 may comprise a channel or rail that may have a reduced profile and that does not include a resilient filler disposed therein because the upper rail of the rear slider window assembly of the present invention does not need substantially receive the upper edge region of the movable window panel therein during the installation or loading of the movable window panel at the window assembly, as discussed below. Optionally, the drive motor assembly may utilize aspects of the drive assemblies of the types described in U.S. Pat. Nos. 4,920,698; 4,995,195; 5,146,712; 5,531,046; 5,572,376; 6,955,009; and/or 7,073,293, and/or U.S. patent application Ser. No. 10/454,040, filed Jun. 4, 2003, published Feb. 5, 2004 as U.S. Publication No. 2004-0020131; and/or Ser. No. 11/948,094, filed Nov. 30, 2007, published Jun. 5, 2008 as U.S. Publication No. 2008-0127563, which are all hereby incorporated herein by reference in their entireties.

Optionally, the window assembly or assemblies of the present invention may utilize aspects of the window assemblies described in U.S. Pat. Nos. 7,073,293; 7,003,916; 6,119,401; 6,026,611; 5,996,284; 5,799,444; and/or 6,691,464, and/or U.S. patent applications, Ser. No. 11/263,221, filed Oct. 31, 2005 and published May 25, 2006 as U.S. Publication No. 2006-0107600; Ser. No. 11/948,094, filed Nov. 30, 2007, published Jun. 5, 2008 as U.S. Publication No. 2008-0127563; Ser. No. 10/454,040, filed Jun. 4, 2003 and published Feb. 5, 2004 as U.S. Publication No. 2004-0020131; Ser. No. 10/408,047, filed Apr. 4, 2003 and published Nov. 20, 2003 as U.S. Publication No. 2003-0213179, and/or Ser. No. 12/850,864, filed Aug. 5, 2010, now U.S. Pat. No. 8,402,695, and/or PCT Application No. PCT/US2011/051506, filed Sep. 13, 2011, and/or Japanese Publication No. 1219280, published on Sep. 1, 1989 and based on Japanese application 63[1988]-43514, filed on Feb. 26, 1988 by Motohiko Kitsukawa et al. of Hashimoto Forming Ind. Co. Ltd of Yokohama-shi Japan, all of which are hereby incorporated herein by reference in their entireties. Optionally, the fixed window panels and movable window panel may include one or more electrically conductive elements, such as heater grids or the like, which may be powered utilizing aspects of the window assemblies described in U.S. patent application Ser. No. 12/850,864, filed Aug. 5, 2010, now U.S. Pat. No. 8,402,695, and/or PCT Application No. PCT/US2011/051506, filed Sep. 13, 2011, which are hereby incorporated herein by reference in their entireties. Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

In the illustrated embodiment, channel member or channel 26 comprises a generally U-shaped channel that is arranged generally horizontally across the rear slider window assembly. Channel 26 may be formed via any suitable forming means and may comprise any suitable material or materials. For example, channel 26 may comprise an extruded metallic channel (such as an extruded aluminum channel or the like) or a steel roll form or a rigid or substantially rigid molded or extruded polymeric channel (such as a polyvinylchloride material or the like) and if polymeric, preferably a rigid polymeric material. As shown in FIG. 4, the channel 26 is an elongated generally U-shaped channel having a base or lower wall 26a and a pair of spaced apart generally vertical walls 26b, 26c extending upwardly from the base or lower wall 26a. The channel 26 may include a plurality of apertures or holes or drain-ways 26d established at and through the lower wall 26a (and/or through other walls thereof) to facilitate drainage of water or moisture from the channel 26. As shown in FIGS. 2 and 3, channel 26 extends substantially across the rear slider window assembly 10 and extends at least partially or substantially along the lower regions of both of the fixed window panels 16, 18.

FIG. 2B shows a prior art construction as disclosed and taught in Japanese Publication No. 1219280, published on Sep. 1, 1989 and based on Japanese application 63[1988]-43514, filed on Feb. 26, 1988 by Motohiko Kitsukawa et al. of Hashimoto Forming Ind. Co. Ltd of Yokohama-shi Japan, which is hereby incorporated herein by reference in its entirety. As can be seen in the prior art sliding window assembly suitable for use in a vehicle shown in FIG. 2B, a slide window panel 3' is accommodated in a sash 12' of the sliding window assembly. A window panel holder 4' is made of a synthetic resin having a lubricating property (such as polyamide or polyacetal) and is fixed at the lower end of slide window panel 3' by using adhesive 15'. Window panel holder 4' is installed at two places in the lower end of slide window panel 3'. However, it can also be arranged over the entire length. A guide channel 16' is arranged such that the lower end of slide window panel 3' and window panel holder 4' can be accommodated in it in a slidable manner. Guide channel 16' forms part of sash 12'. It is welded along with a retainer to a bracket 18' using welding part 17'. Bracket 18' is used to install the sliding window assembly on a door of the equipped vehicle. Guide channel 16' is formed into a U-shape by bending a metal plate. Its upper end is bent inwards to form inwardly turned or formed lips or tabs 16a'. It has an interior slide groove 19' and has an opening part at the top. Window panel holder 4' slides in slide groove 19'. In order to facilitate the sliding, protrusions 21' contacting the inner walls of guide channel 16' are formed on both sides of the bottom part and on both side parts to reduce the sliding resistance, and to reduce accumulation of foreign matter accommodating space 22'. An engagement recessed part 29' that accommodates and engages with connection member 6' and an accommodating recessed part that accommodates element bar 7' are arranged at the bottom of window panel holder 4'. Element bar 7' is made of a wire, etc. Its two ends are inserted into a tube-shaped connection member 6' to form an endless shape. A connection member 6' is accommodated and engaged with the engagement recessed part 29' of window panel holder 4'.

Figure 2A:
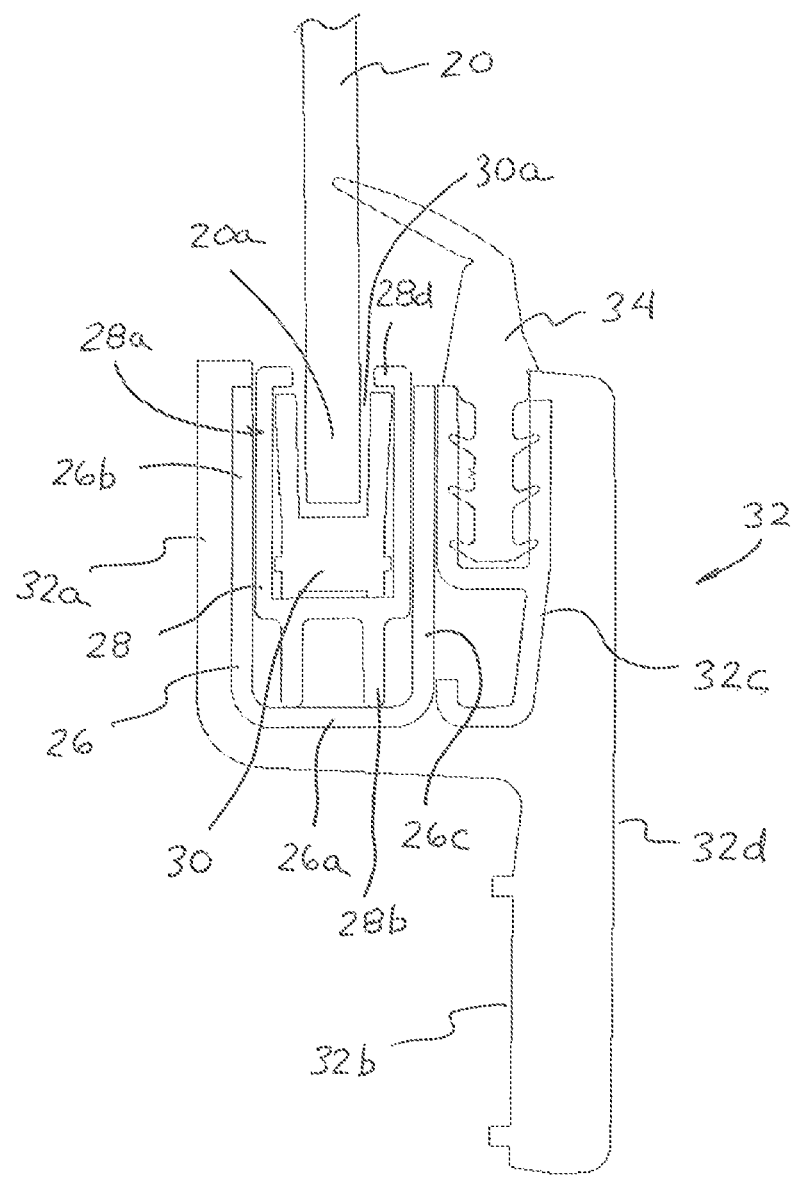
FIG. 2A is a sectional view of the lower portion of the rear slider window assembly taken along the line A-A of FIG. 2.

As can be seen by comparison of the prior art construction shown in FIG. 2B to a embodiment of the present invention shown in FIG. 2A, the construction shown in FIG. 2A is that of FIG. 2B with additional improvement of the present invention relating to manufacture and assembly of the window.

As shown in FIG. 2A, guide element 28 is formed separate from formation of channel 26 (and may be, and preferably is, formed of a material that is distinct and different from the material used to from channel 26). Preferably, guide element 28 is a polymeric molding formed in an injection molding operation. Guide element 28 is formed, preferably via injection molding, to have a generally U-shaped guide portion 28a with a pair of lower protrusions 28b extending downwardly therefrom and also to include inwardly turned or formed lips or tabs 28d.

In a separate forming operation (such as, for example, a metal extrusion operation such an aluminum extrusion or the like), channel 26 is formed to have an elongated generally U-shaped channel having a base or lower wall 26a and a pair of spaced-apart generally vertical walls 26b, 26c extending upwardly from the bottom or base or lower wall 26a, preferably including a plurality of apertures or holes or drain-ways 26d established at and through the lower wall 26a (and/or through other walls thereof) to facilitate drainage of water or moisture from the channel 26 (such as by utilizing aspects of the window assemblies described in PCT Application No. PCT/US2011/051506, filed Sep. 13, 2011 and published Mar. 22, 2012 as International Publication No. WO 2012/037190, which is hereby incorporated herein by reference in its entirety). Unlike the construction of guide element 28, the upper portion of the vertical walls 26b, 26c do not have any inwardly turned or formed lips or tabs of any sort.

Forming guide element 28 in a separate operation from formation of channel 26 has several advantages. Guide element 28 may be formed of a different material than what is used to form channel 26 (for example, a polymeric material versus a metal) and guide element 28 may be formed by a different manufacturing method than what is used to form channel 26 (for example, polymer injection molding versus metal extrusion). By forming guide element 28 in a separate operation from formation of channel 26, tooling complexity is reduced and the cost and complexity to manufacture can also be reduced. Guide element 28 can also be readily formed to have a length dimension shorter than that of channel 26 (for example, guide element 28 may have a length dimension that is about half the length dimension of channel 26, and preferably the length dimension of guide element 28 is less than the length dimension of channel 26 by at least the length dimension of carrier 30).

Figure 9:
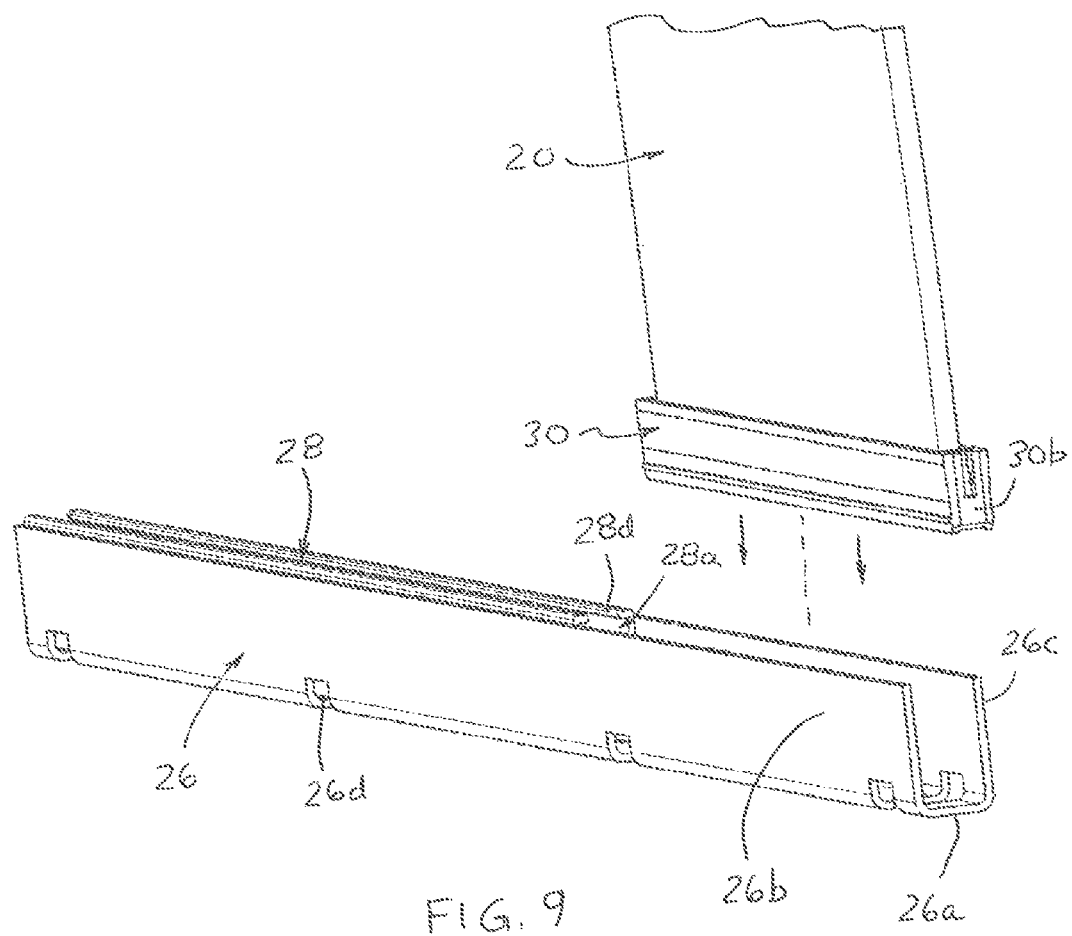
FIG. 9 is another perspective view of the lower channel element and guide element and movable window panel assembly of FIG. 7, showing the movable window panel and carrier assembled together and the channel element and guide element assembled together.
Figure 10:
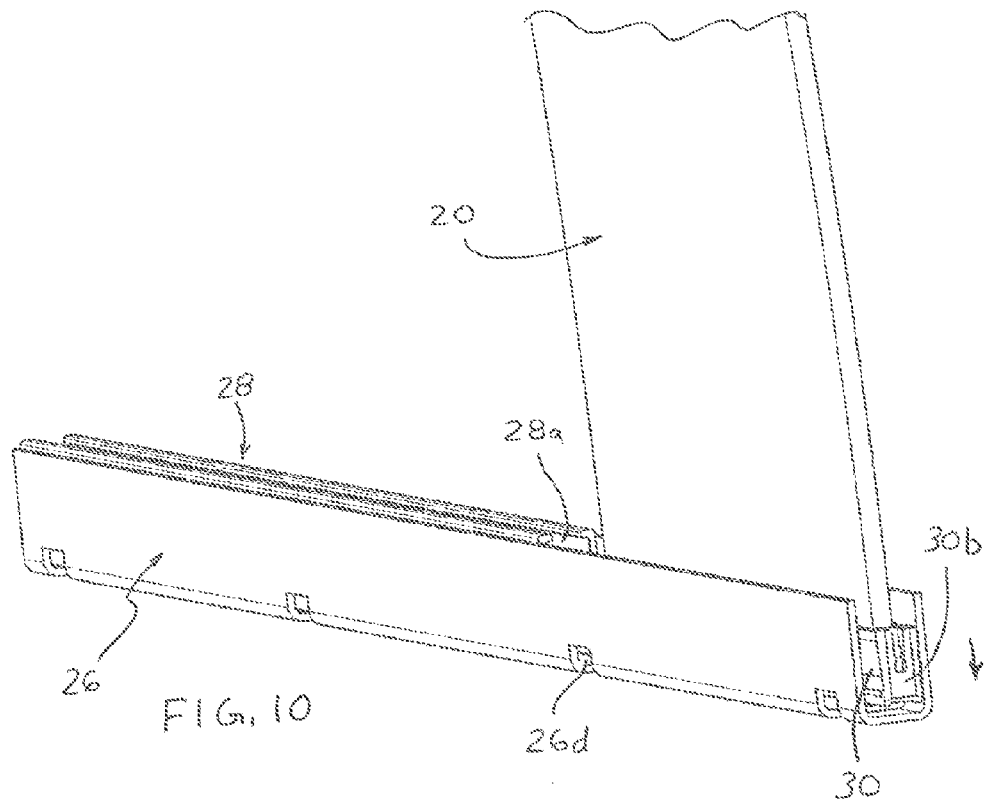
FIG. 10 is a perspective view of the lower channel element and guide element and movable window panel assembly, with the carrier and window panel inserted into the channel element next to the guide element, such as for installing or removing the movable window panel at the rear slider window assembly.

Once separately formed, guide element 28 is inserted into channel 26 (such as is illustrated in FIGS. 8 and 9) and then is secured and fixed in channel 26, such by adhesive gluing (using for, example, an epoxy adhesive or a silicone adhesive or a urethane adhesive) or by mechanical attachment. As illustrated such as in FIG. 9, when secured and fixed in channel 26, guide element 28 preferably extends from one end of channel 26 partially but not fully towards the other end of channel 26, leaving a portion of channel 26 unoccupied by guide element 28. This unoccupied portion of channel 26 thus facilitates (such as shown in FIGS. 9 and 10) insertion of carrier 30 (with movable window panel 20 inserted and secured therein or thereto) into channel 26 and guide element 28.

Thus, and as shown in FIG. 2A, channel 26 may be insert molded or otherwise disposed to be fixed or secured in a channel portion 32a of a lower frame or mounting element 32, which is configured to mount to the sheet metal or body or the like of the vehicle (such as via use of an adhesive or the like disposed at an attaching portion 32b of mounting element 32). Mounting element 32 may comprise any suitable material and may be formed via any suitable forming means, and may have a seal retaining portion or channel 32c for receiving and retaining a sliding seal 34 for slidably sealing against the surface of the movable window panel 20 as the movable panel 20 is moved between its opened and closed positions and for sealing against the surface of the movable window panel 20 when it is in its closed position or its opened position. The outer surface 32d of mounting element 32 may be generally flush with the outer surface of the fixed window panels at the opposed ends or edge regions of the fixed window panels or the mounting element may extend over the outer surface of the fixed window panels to provide a generally uniform outer frame portion at and along the surfaces of the fixed window panels and across the opening between the fixed window panels where the movable window panel is disposed when in its closed position (and optionally, the mounting element may be molded or formed with polycarbonate window panels such as by utilizing aspects of the rear slider window assemblies described in PCT Application No. PCT/US2011/051506, filed Sep. 13, 2011 and published Mar. 22, 2012 as International Publication No. WO 2012/037190, which is hereby incorporated herein by reference in its entirety).

Mounting element 32 may be molded of a polymeric material and channel 26 may be insert molded in mounting element 32. Because channel 26 comprises generally straight walls 26b, 26c, the mold that forms mounting element 32 may be formed to support the wall 26b at its inner surface to limit or substantially preclude inward flexing or bending or warping of the wall 26b during the injection molding process that forms the mounting element 32 around the wall 26b and lower wall 26a of channel 26. Thus, the present invention provides enhanced molding or forming of the mounting element around or partially around the channel 26 and may achieve reduced scrap, at least in part because of the straight wall 26b of U-shaped channel 26 without any protrusions and without any inwardly turned or formed lips or tabs or the like along its inner surface or at the top of its side walls. Mounting element 32 may also include one or more holes or drainage channels or the like for draining water or moisture from guide element 28, channel 26 and mounting element 32. Optionally, the rear slider window assembly may include one or more water drainage conduits such as the types described in PCT Application No. PCT/US2011/051506, filed Sep. 13, 2011 and published Mar. 22, 2012 as International Publication No. WO 2012/037190, which is hereby incorporated herein by reference in its entirety.

When the window is assembled, guide element 28 is received in channel 26 and extends partially along channel 26. For example, the length dimension of guide element 28 is selected so as to extend substantially along one of the fixed window panels 16 to provide guidance and support for the movable window panel 20 and carrier 30 as the movable window panel is moved to its fully opened position and so as to extend substantially along the opening or gap between the fixed window panels 16, 18 to provide guidance and support for the movable window panel 20 and carrier 30 as the movable window panel is moved to its fully closed position. Guide element 28 does not extend along channel 26 at the other fixed window panel 18, thereby providing clearance for insertion of carrier 30 into channel 26 for installation of (or removal of) the movable window panel 20, as discussed below.

Guide element 28 may comprise any suitable material and may be formed via any suitable means, such as, for example, by extrusion of a metallic material or polymeric material or by molding (such as by injection molding) of a polymeric material. Guide element 28 may comprise the same material as channel 26 or may comprise a different material, depending on the particular application of the rear slider window assembly. In the illustrated embodiment, and as shown in FIG. 5, guide element 28 comprises a generally U-shaped guide portion 28a with a pair of lower protrusions 28b extending downwardly therefrom. As shown in FIG. 2A, guide element 28 is received and then secured/fixed in channel 26 with protrusions 28b resting at lower wall 26a in channel 26. The guide portion 28a receives carrier 30 therein and the upper ends of the walls 28c of guide portion 28a have inwardly turned or formed lips or tabs 28d to define an opening or gap therebetween, along which the slidable window panel 20 is moved as it moves between its opened and closed positions. As shown in FIG. 5, guide element 28 may also include one or more openings or drainage passageways 28e for draining water or moisture from the guide element 28. When movable window panel 20 is moved to open or close when normally mounted in the equipped vehicle, it is supported solely by the bottom wall of guide portion 28a as the bottom of carrier 30 slides along the bottom wall of guide portion 28a. When movable window panel 20 is moved to open or close when normally mounted in the equipped vehicle and while carrier 30 slides along the bottom wall of guide portion 28a, carrier 30 makes no contact with, and is never supported by, inwardly turned or formed lips or tabs 28d. Inwardly turned or formed lips or tabs 28d do not at least partially support carrier 30 and inwardly turned or formed lips or tabs 28d do not hold the carrier 30 in position so as to keep carrier 30 from falling, sinking or slipping. Inwardly turned or formed lips or tabs 28d do not at least partially support carrier 30.

Carrier 30 has a slot or receiving portion 30a therealong that is configured to receive the lower edge region 20a of movable window panel 20 (and be secured and fixed thereto such as via adhesive attachment) to movably support the lower edge region of the movable window panel 20 along the guide element 28 and channel 26 (and optionally, the carrier may be molded or formed with a polycarbonate window panel such as by utilizing aspects of the rear slider window assemblies described in PCT Application No. PCT/US2011/051506, filed Sep. 13, 2011 and published Mar. 22, 2012 as International Publication No. WO 2012/037190, which is hereby incorporated herein by reference in its entirety). In the illustrated embodiment, and as shown in FIG. 6, carrier 30 comprises a generally U-shaped receiving portion 30a, with end portions 30b formed at each end of carrier 30 for attaching the carrier to the cables of the powered drive system. For example, the end portions 30b of carrier 30 may have a slot or opening 30c formed therein that is shaped to receive an enlarged end cap of a cable therein, while the narrower cable (that is narrower than its end cap) extends through a narrower portion of the slot or opening 30c formed at the end of the carrier 30. Thus, when either cable or cable end is moved to pull at the carrier, the carrier is pulled in the appropriate direction to open or close the movable window panel 20. Carrier 30 may be formed via any suitable forming means and may comprise any suitable material or materials, while remaining within the spirit and scope of the present invention.

Figure 11:
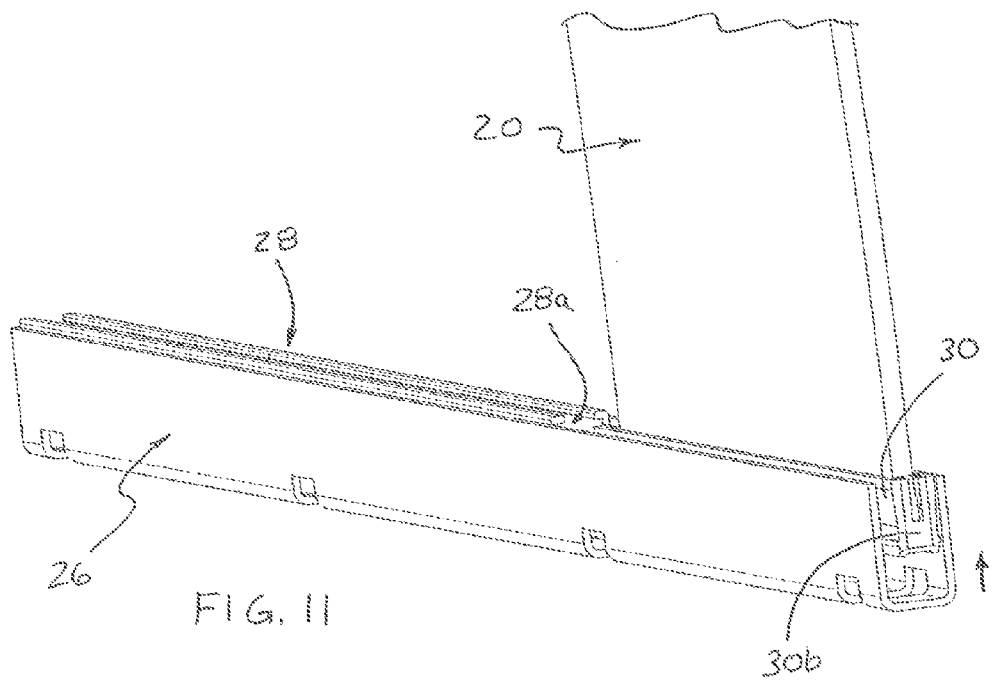
FIG. 11 is another perspective view of the lower channel element and guide element and movable window panel assembly of FIG. 10, showing the carrier and window panel raised relative to the channel element to be at a level for sliding insertion of the carrier into and along a guide portion of the guide element.
Figure 12:
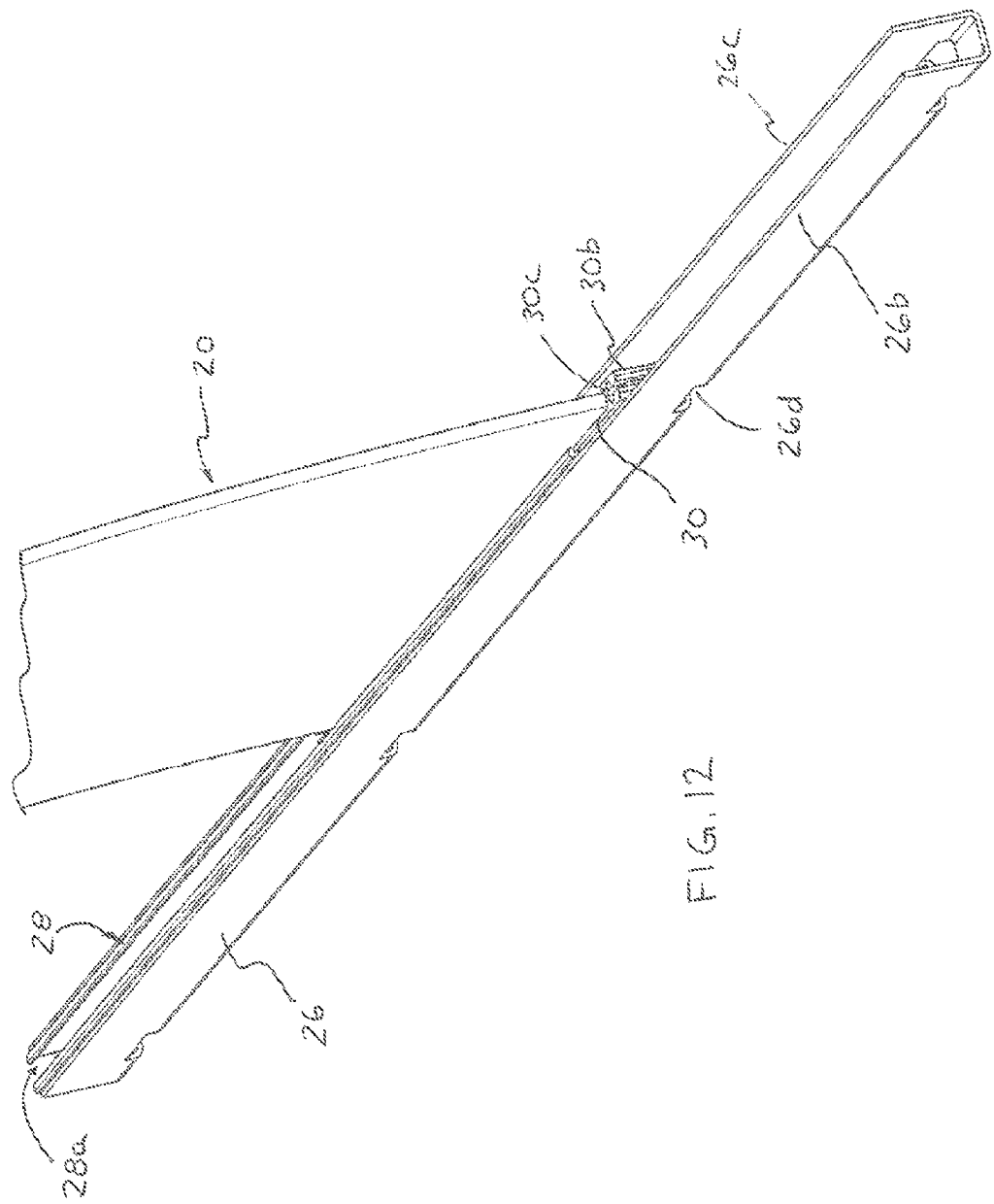
FIG. 12 is another perspective view of the lower channel element and guide element and movable window panel assembly, shown assembled together with the carrier received in and partially along the guide portion of the guide element that is disposed in and partially along the channel element.
Figure 13:
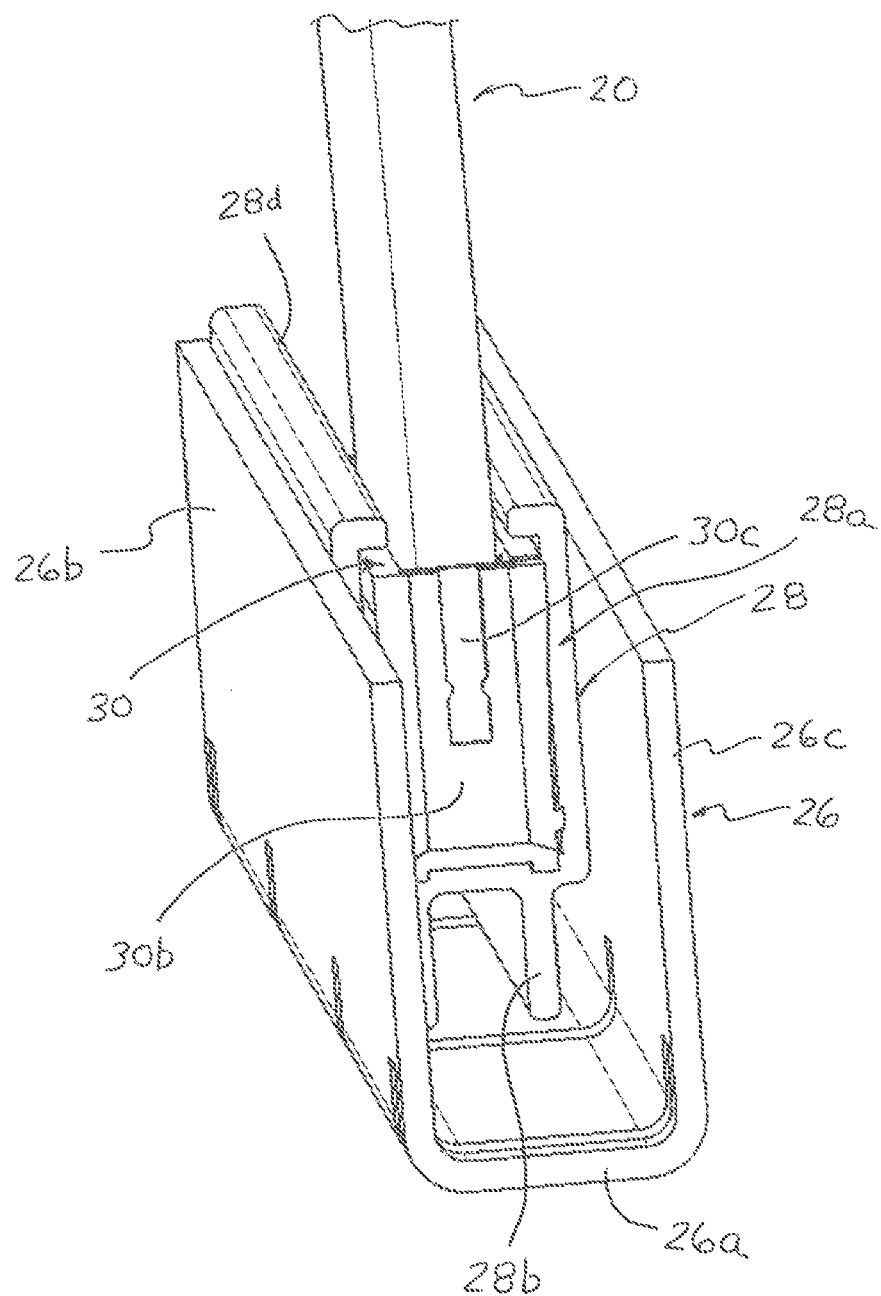
FIG. 13 is another perspective view of the lower channel element and guide element and movable window panel assembly of FIG. 12.
Figure 14:
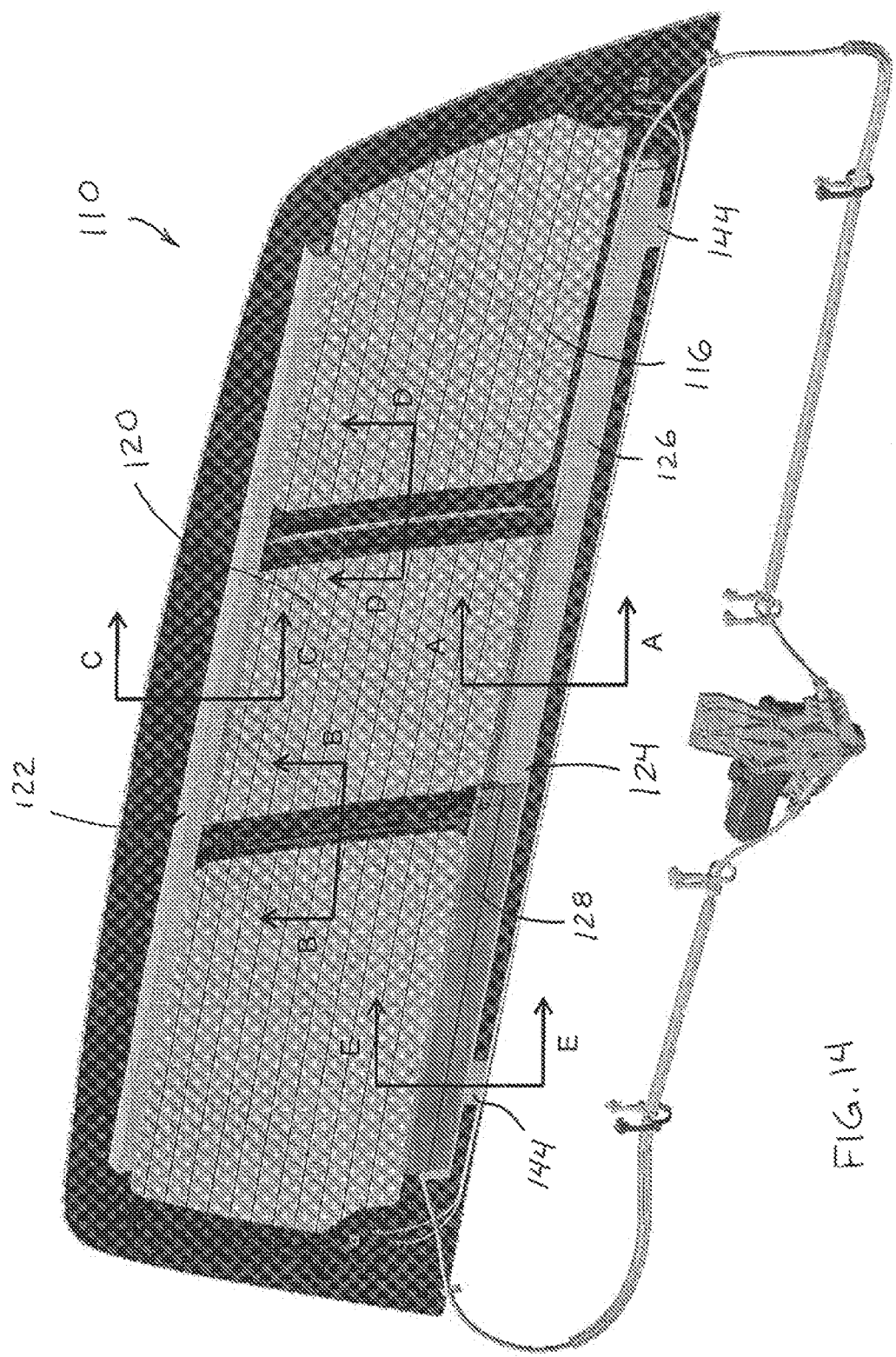
FIG. 14 is a perspective view of another rear slider window assembly of the present invention, as viewed from the forward or interior side of the window assembly when the window assembly is normally mounted to a vehicle.

As can be seen in FIG. 7, the length of carrier 30 is less than the length of guide element 28, which has a length that is less than the length of channel 26. As shown in FIGS. 8 and 9, carrier 30 receives the lower edge region of movable window panel 20 therein, while guide element 28 is received along a portion of channel 26. Guide element 28 may be secured relative to and in channel 26 via any suitable attaching means, such as via an adhesive or tape or fasteners or the like. As can be seen with reference to FIGS. 9-11, when guide element 28 is received in and attached to channel 26, channel 26 extends beyond the end of guide element 28 an amount sufficient to receive the carrier 30 therein when loading or unloading or installing/uninstalling the movable window panel at the rear slider window assembly. For example, a length dimension of the guide element 28 may be less than a length dimension of the channel 26 by at least a distance corresponding to a length dimension of the carrier 30, so as to provide clearance for insertion of the carrier 30 into the channel 26 where the guide element 28 is not disposed, such as during loading or installation of the carrier and movable window panel. Thus, and as shown in FIGS. 9 and 10, the carrier 30 may be inserted into and received in the channel 26 where guide element 28 is not disposed, and may be inserted fully into channel 26 (FIG. 10) to provide clearance for inserting the upper edge region (not shown in FIG. 10) of movable window panel 20 in the upper channel of upper rail 22 of frame portion 14. After the upper edge region of the movable window panel is received in the upper rail 22 of frame portion 14, the carrier 30 may be raised upward in channel 26 (FIG. 11) so as to align the carrier 30 with the receiving portion or guide portion 28a of guide element 28. When so positioned and aligned, the carrier 30 may be moved into and along guide portion 28a of guide element 28 (FIGS. 12 and 13) towards its closed position, whereby the cables of the powered drive system may be connected to the end regions 30b of carrier 30. When the cables of the drive system are connected to the ends of the carrier, the cables and drive system control the movement of the carrier and movable window panel along the guide element 28 and limit or substantially preclude movement of the carrier and movable window panel beyond the ends of the guide element 28, such that the carrier is supported by bottom wall of the guide portion of the guide element throughout the range of motion of the movable window panel and during operation of the drive system when the subject slider window assembly is normally mounted and used in the equipped vehicle.

Although shown and described as comprising a pair of spaced apart fixed window panels with an opening established therebetween (and with upper and lower appliqués or trim or filler panels or elements disposed at the upper and lower regions of the opening and between the fixed window panels), the window assembly of the present invention may comprise a hole-in-glass window configuration, where a single fixed window panel has an aperture or hole or opening established therethrough. For example, and with reference to FIGS. 14 and 15A-E, a rear slider window assembly 110 of a vehicle (such as a pickup truck or the like) includes a window frame 114, a single fixed window panel 116 having an opening or aperture established or formed therethrough (such as described in PCT Application No. PCT/US2011/051506, filed Sep. 13, 2011 and published Mar. 22, 2012 as International Publication No. WO 2012/037190, which is hereby incorporated herein by reference in its entirety), and a movable window panel 120 that is movable relative to frame 114 and fixed window panel 116 between an opened position and a closed position. Frame 114 comprises an upper rail 122 and a lower rail 124, with the upper and lower edge regions of movable window panel 120 slidably received in and along the respective upper and lower rails 122, 124. Lower rail 124 comprises a generally U-shaped channel portion 126 that is disposed generally horizontally along the rear slider window (and adhered or bonded to the inner surface 116a of the fixed window panel 116) and spanning at least part of the fixed window panel 116, with a guide element 128 received in and fixedly secured (such as by gluing or by mechanically securing) in channel 126 and extending only partially along channel 126, such as extending along a portion of the fixed window panel 116 and the opening for the movable window panel 120. The lower edge region 120a of the movable window panel 120 is received in or attached to a carrier 130, which is movably received in guide element 128 and is movable or slidable along guide element 128 as the movable window panel 120 is moved between its opened and closed positions. Because the rail 122, channel 126, guide element 128 and carrier 130 may be similar to the respective components of the window assembly 10, discussed above, a detailed discussion of these components and their functions need not be repeated herein.

As shown in FIG. 15A, the channel or channel portion 126 may be adhered or bonded to the inner surface 116a of the fixed window panel 116, such as via an adhesive bond or adhesive layer 117 disposed at a recessed portion of the channel 126 or the like. A sealing element 134 may be disposed along the inner surface of the fixed window panel and at the lower perimeter of the opening (such as via adhesive bonding of the sealing element at the inner surface of the fixed window panel, and such as at an opaque coating or frit layer disposed or established at the fixed panel around the window opening) and generally above the rail 124, to seal against the outer surface 120b of the movable window panel 120 and slidingly seal against the outer window panel surface as the movable window panel is moved between its opened and closed positions.

As shown in FIG. 15C, an upper sealing element 136 may be similarly disposed at or bonded at the inner surface of the fixed glass window panel 116 at and along the upper perimeter region of the window opening for sealing against an upper region of the movable window panel 120. As also shown in FIG. 15C, the upper edge portion 120c of movable window panel 120 may be received in the upper rail 122, which may include a sealing element or sliding element 138 therein for facilitating sliding movement of the movable window panel 120 along the upper rail 122. Upper rail 122 may be bonded or adhered to the inner surface of the fixed window panel such as in a similar manner as the lower rail 124, discussed above.

Figure 15D:
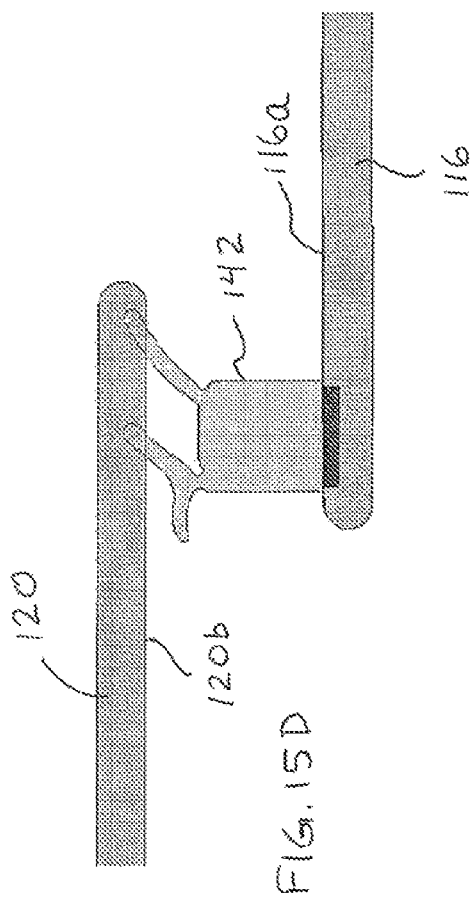
FIG. 15D is a sectional view of the rear slider window assembly taken along the line D-D in FIG. 14.
Figure 15B:
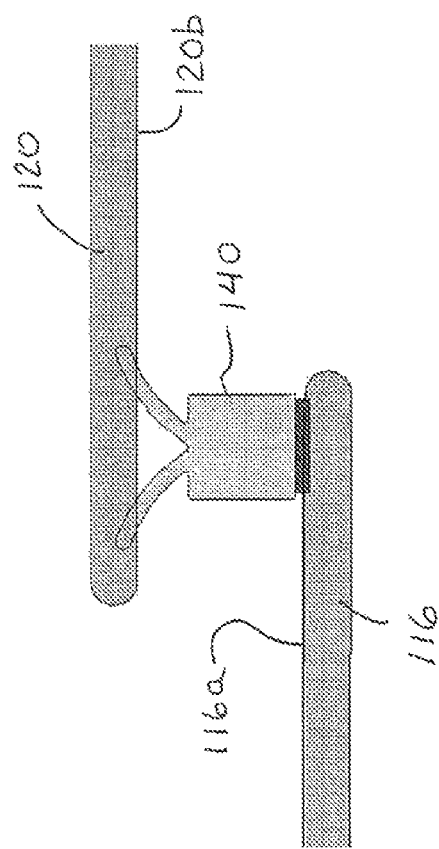
FIG. 15B is a sectional view of the rear slider window assembly taken along the line B-B in FIG. 14.

As shown in FIGS. 15B and 15D, the window assembly includes sliding sealing elements 140, 142 at the inner surface 116a of the fixed window panel at the side perimeter regions of the window opening. For example, sealing element 140 (FIG. 15B) may comprise a Y-seal and may be adhered to the inner surface of the fixed window panel 116 so that its Y-seal lips or sealing elements slidingly engage the outer surface 120b of the movable window panel 120 as it is moved in either direction between its opened and closed positions. Similarly, sealing element 142 (FIG. 15D) may be adhered to the inner surface of the fixed window panel 116 and may comprise a pair of sealing lips or elements that slidingly engage the outer surface 120b of the leading edge region of the movable window panel 120 as it is moved towards and into its closed position and moved from its closed position. As can be seen with reference to FIG. 14, when the movable window panel is moved from its closed position towards its open position, the movable window panel will be disengaged from sealing element 142.

Optionally, the rear slider window assembly 110 may include one or more water drainage conduits 144 (FIG. 15E), in order to facilitate draining of water from the lower rail 124 and channel 126. The water drainage elements or conduits may comprise any suitable elements, and may utilize aspects of the elements and window assemblies described in PCT Application No. PCT/US2011/051506, filed Sep. 13, 2011 and published Mar. 22, 2012 as International Publication No. WO 2012/037190, which is hereby incorporated herein by reference in its entirety. For example, and with reference to FIG. 15E, the water drainage conduit 144 may be formed with or integrally formed or molded with the lower rail 124, such that a passageway 144a is established between a portion of the rail 124 and the inner surface 116a of the fixed window panel 116. The water drainage conduit 144 may provide side walls along the passageway 144a that may be adhered or bonded to or engaged with the inner surface 116a of the fixed window panel 116, such as described in PCT Application No. PCT/US2011/051506, filed Sep. 13, 2011 and published Mar. 22, 2012 as International Publication No. WO 2012/037190, which is hereby incorporated herein by reference in its entirety.

The window assembly 110 thus may provide a flush exterior surface with a single fixed window panel, with the movable panel movable along and behind the single fixed window panel between its opened and closed positions. The fixed window panel 116 may include an opaque coating or layer or frit layer or the like disposed about its perimeter and around the edges that bound the window opening, in order to conceal or hide or render covert the rails and sealing elements disposed at the fixed panel. Likewise, the movable window panel 120 may include an opaque coating or layer or frit layer or the like disposed about its perimeter regions, in order to conceal or hide or render covert the sealing elements disposed at the fixed panel, such as when the movable window panel is in its closed position.

Thus, the rear slider window assembly of the present invention provides a lower channel and guide and carrier construction that facilitates insertion or loading of the movable window panel at the side of the rear slider window assembly opposite the side that the movable window panel is moved towards when moved towards its opened position. The rear slider window assembly of the present invention provides for easier loading and unloading of the movable window panel and does so without a larger upper rail or channel and filler material that is typically used in conventional slider window assemblies to allow for greater insertion of the upper edge region of the movable window panel during the insertion or loading process. The rear slider window assembly of the present invention also provides for enhanced molding or forming processes in forming the lower mounting element at and at least partially around the lower metallic or substantially rigid plastic channel and limits or reduces scrap that may otherwise occur in prior conventional constructions due to warping or bending of the walls of the channel during the overmolding processes (due to the non-straight inner surfaces of the prior conventional channel constructions).

Thus, for example, and in accordance with the present invention, a channel assembly is formed from two separate parts, where a guide element is separately formed and a generally U-shaped channel is separately formed, and the guide element is secured and fixed into the channel as is shown in FIGS. 9-13. This differs from the prior art illustrated in FIG. 2B, where the prior art guide channel is formed in a single forming or manufacturing operation that includes formation of the inwardly turned or formed lips or tabs at the top of the sidewalls of the prior art guide channel. Moreover, in accordance with the present invention, the portion of the generally U-shaped channel that is unoccupied by the guide element when the window assembly is fully assembled serves no support function for the guide element or carrier and is not occupied by the guide element or carrier after the guide element is inserted into and secured/fixed in the generally U-shaped channel and after the carrier is inserted into the guide element during the initial assembly of the slider window assembly.

The benefits of embodiments of the present invention may also be realized in sliding window constructions where an aperture is created in a fixed window panel and where a movable window panel can be made to open or close the aperture. Slider windows of this type are disclosed such as in U.S. patent application Ser. No. 10/408,047, filed Apr. 4, 2003, published Nov. 20, 2003 as U.S. Publication No. 2003-0213179, and/or such as in RE41502, and/or such as in PCT Application No. PCT/US2011/051506, filed Sep. 13, 2011 and published Mar. 22, 2012 as International Publication No. WO 2012/037190, which are hereby incorporated herein by reference in their entireties.

The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:

a frame portion having an upper rail and a lower rail;

at least one fixed window panel that is fixed relative to said frame portion, said at least one fixed window panel defining an opening;

a movable window panel that is movable along said upper and lower rails, wherein said movable window panel is movable between a closed position where said movable window panel is disposed at said opening and an opened position where said movable window panel is disposed at least partially along said first fixed window panel;

wherein said lower rail comprises a channel that extends at least partially along said at least one fixed window panel and said opening;

wherein said lower rail comprises a guide element that is formed in a forming operation that is separate and distinct from a forming operation used to form said channel of said lower rail, and wherein said guide element is secured to said channel so that said guide element extends at least partially along said at least one fixed window panel and said opening;

wherein a carrier is established at a lower portion of said movable window panel and is configured to be received in and to move along an inner surface of a guide portion of said guide element; and wherein said channel extends at least partially along said at least one fixed window panel and a portion of said channel extends beyond an end of said guide element such that said portion of said channel has a length dimension that is at least as long as a length dimension of said carrier, wherein said portion of said channel is configured to receive said carrier at said at least one fixed window panel during loading of said movable window panel in said upper and lower rails, and wherein said portion of said channel is configured to receive said movable window panel at a first depth during loading of said movable window panel and wherein said guide portion is configured to receive said movable window at a second depth, and wherein said movable window panel is raised to said second depth to generally align said carrier with said guide portion of said guide element for insertion of said carrier into said guide portion for movement along said inner surface of said guide portion.

2. The slider window assembly of claim 1, wherein said channel is generally U-shaped and comprises a lower wall and a pair of spaced apart generally vertical walls extending from said lower wall, and wherein said lower wall of said channel is below said inner surface of said guide portion of said guide element.

3. The slider window assembly of claim 2, wherein said generally vertical walls have substantially flat inner surfaces.

4. The slider window assembly of claim 3, wherein said channel is insert molded into a mounting element of said slider window assembly.

5. The slider window assembly of claim 1, wherein a length dimension of said guide element is less than a length dimension of said channel by at least a length dimension of said carrier.

6. The slider window assembly of claim 1, wherein said at least one fixed window panel comprises first and second fixed window panels defining an opening therebetween.

7. The slider window assembly of claim 6, wherein, when said guide element is received in said channel, said guide element is secured and fixed to said channel so that said guide element extends at least partially along said first fixed window panel and said opening, and wherein said channel extends at least partially along said second fixed window panel and beyond an end of said guide element so as to receive said carrier therein at said second fixed window panel during loading of said movable window panel in said upper and lower rails.

8. The slider window assembly of claim 1, wherein said at least one fixed window panel comprises a single fixed window panel, and wherein said opening is established through said single fixed window panel.

9. The slider window assembly of claim 1, wherein said guide portion of said guide element comprises a generally U-shaped guide channel, and wherein said generally U-shaped guide channel of said guide portion of said guide element is at a level above a lower wall of said channel of said lower rail.

10. The slider window assembly of claim 1, wherein, when said movable window panel is at said first depth, an upper portion of said movable window panel is movable to align with a channel of said upper rail, and wherein, when said movable window panel is at said second depth, said upper portion of said movable window panel is received in said channel of said upper rail.

11. A slider window assembly for a vehicle, said slider window assembly comprising:

a frame portion having an upper rail and a lower rail;

at least one fixed window panel that is fixed relative to said frame portion, said at least one fixed window panel defining an opening;

a movable window panel that is movable along said upper and lower rails, wherein said movable window panel is movable between a closed position where said movable window panel is disposed at said opening and an opened position where said movable window panel is disposed at least partially along said first fixed window panel;

wherein said lower rail comprises a channel that extends at least partially along said at least one fixed window panel and said opening;

wherein said lower rail comprises a guide element that is formed in a forming operation that is separate and distinct from a forming operation used to form said channel of said lower rail, and wherein, when said guide element is received in said channel, said guide element is secured and fixed to said channel so that said guide element extends at least partially along said at least one fixed window panel and said opening;

wherein a carrier is established at a lower portion of said movable window panel and is configured to be received in and to move along an inner surface of a bottom wall of a guide portion of said guide element;

wherein said channel extends at least partially along said at least one fixed window panel and beyond an end of said guide element so as to receive said carrier therein at said at least one fixed window panel during loading of said movable window panel in said upper and lower rails, and wherein said movable window panel is received in said channel at a first depth during loading of said movable window panel and is raised to a second depth to generally align said carrier with said guide portion of said guide element for insertion of said carrier into said guide portion for movement along said inner surface of said bottom wall of said guide portion;

wherein said guide portion of said guide element comprises a generally U-shaped guide channel, and wherein said guide element is configured so that, when said guide element is received in said channel of said lower rail, said generally U-shaped guide channel is at a level above a lower wall of said channel of said lower rail; and wherein said guide element comprises at least one leg element that engages said lower wall of said channel of said lower rail and spaces said generally U-shaped guide channel above said lower wall of said channel of said lower rail.

12. A slider window assembly for a vehicle, said slider window assembly comprising:

a frame portion having an upper rail and a lower rail;

at least one fixed window panel that is fixed relative to said frame portion, said at least one fixed window panel defining an opening;

a movable window panel that is movable along said upper and lower rails, wherein said movable window panel is movable between a closed position where said movable window panel is disposed at said opening and an opened position where said movable window panel is disposed at least partially along said first fixed window panel;

wherein said lower rail comprises a channel that extends at least partially along said at least one fixed window panel and said opening;

wherein said lower rail comprises a guide element that is formed in a forming operation that is separate and distinct from a forming operation used to form said channel of said lower rail, and wherein, when said guide element is received in said channel, said guide element is secured and fixed to said channel so that said guide element extends at least partially along said at least one fixed window panel and said opening;

wherein a carrier is established at a lower portion of said movable window panel and is configured to be received in and to move along an inner surface of a bottom wall of a guide portion of said guide element;

wherein said channel extends at least partially along said at least one fixed window panel and beyond an end of said guide element so as to receive said carrier therein at said at least one fixed window panel during loading of said movable window panel in said upper and lower rails, and wherein said movable window panel is received in said channel at a first depth during loading of said movable window panel and is raised to a second depth to generally align said carrier with said guide portion of said guide element for insertion of said carrier into said guide portion for movement along said inner surface of said bottom wall of said guide portion;

wherein said guide portion of said guide element comprises a generally U-shaped guide channel, and wherein said guide element is configured so that, when said guide element is received in said channel of said lower rail, said generally U-shaped guide channel is at a level above a lower wall of said channel of said lower rail; and wherein said guide portion of said guide element comprises at least one tab element at an upper region of said generally U-shaped guide channel to limit upward movement of said carrier when said carrier is received in said generally U-shaped guide channel of said guide element.

13. A slider window assembly for a vehicle, said slider window assembly comprising:

a frame portion having an upper rail and a lower rail;

at least one fixed window panel that is fixed relative to said frame portion, said at least one fixed window panel defining an opening;

a movable window panel that is movable along said upper and lower rails, wherein said movable window panel is movable between a closed position where said movable window panel is disposed at said opening and an opened position where said movable window panel is disposed at least partially along said first fixed window panel;

wherein said lower rail comprises a generally U-shaped channel that extends at least partially along said at least one fixed window panel and said opening;

wherein said lower rail comprises a guide element that is formed in a forming operation that is separate and distinct from a forming operation used to form said channel of said lower rail;

wherein said guide element is secured and fixed relative to said channel so that said guide element extends at least partially along said at least one fixed window panel and said opening;

wherein said movable window panel includes a carrier established at a lower portion of said movable window panel and wherein said carrier is configured to be received in and to move along said guide element;

wherein a length of said channel of said lower rail is greater than a length of said guide element and wherein a length of said guide element is greater than a length of said carrier, and wherein said length of said channel is greater than said length of said guide element by at least a distance generally corresponding to said length of said carrier; and wherein a portion of said channel of said lower rail extends beyond an end of said guide element and is unoccupied by said guide element, and wherein said carrier is received in said portion of said channel during loading of said movable window panel in said upper and lower rails, and wherein said carrier of said movable window panel is received in said portion of said channel at a first depth during loading of said movable window panel and is raised to a second depth to generally align said carrier with said guide element for insertion of said carrier into said guide element for movement along said guide element.

14. The slider window assembly of claim 13, wherein, when said movable window panel is at said first depth, an upper portion of said movable window panel is movable to align with a channel of said upper rail, and wherein, when said movable window panel is at said second depth, said upper portion of said movable window panel is received in said channel of said upper rail.

15. The slider window assembly of claim 13, wherein said at least one fixed window panel comprises spaced apart first and second fixed window panels with said opening therebetween, and wherein said guide element is secured and fixed to said channel so that said guide element extends at least partially along said first fixed window panel and said opening, and wherein said channel extends at least partially along said second fixed window panel and beyond said end of said guide element so as to receive said carrier therein at said second fixed window panel during loading of said movable window panel in said upper and lower rails.

16. The slider window assembly of claim 13, wherein said at least one fixed window panel comprises a single fixed window panel and wherein said opening is established through said single fixed window panel.

17. The slider window assembly of claim 13, wherein said guide element is generally U-shaped for receiving said carrier therein.

18. The slider window assembly of claim 17, wherein said generally U-shaped guide channel of said guide element is at a level above a bottom wall of said channel of said lower rail.

19. The slider window assembly of claim 18, wherein said guide element comprises at least one leg element that engages said bottom wall of said channel of said lower rail and spaces said generally U-shaped guide channel above said bottom wall of said channel of said lower rail.

20. The slider window assembly of claim 17, wherein said guide element comprises at least one tab element at an upper region of said generally U-shaped guide channel to limit upward movement of said carrier when said carrier is received in said generally U-shaped guide channel of said guide element.

* * * * *